United States Patent [19]

Kamiya et al.

[11] 4,038,060
[45] July 26, 1977

[54] APPARATUS FOR TREATING AN EXHAUST GAS FROM NUCLEAR PLANT

[75] Inventors: Kunio Kamiya; Hideo Yusa; Fumito Nakajima; Masato Takeuchi, all of Ibaraki, Japan

[73] Assignee: Hitachi, Ltd., Tokyo, Japan

[21] Appl. No.: 570,884

[22] Filed: Apr. 23, 1975

Related U.S. Application Data

[63] Continuation of Ser. No. 419,006, Nov. 26, 1973, abandoned.

[30] Foreign Application Priority Data

Dec. 1, 1972   Japan ................... 47-119903

[51] Int. Cl.$^2$ .................. B01D 53/04; C01B 23/00; F25J 3/00; G21C 19/32
[52] U.S. Cl. .................................. 62/36; 62/42; 62/44; 176/37; 176/38; 55/66
[58] Field of Search ............... 62/36, 42, 44; 55/66; 176/37, 38; 250/506, 507, 515

[56] References Cited

U.S. PATENT DOCUMENTS

| | | | |
|---|---|---|---|
| 1,694,967 | 12/1928 | Coolidge | 215/13 R |
| 2,999,366 | 9/1961 | La Fave et al. | 220/9 LG X |
| 3,203,866 | 8/1965 | Lehmer et al. | 176/37 |
| 3,256,441 | 6/1966 | Grasty | 220/17 |
| 3,404,067 | 10/1968 | Reudos | 176/37 |
| 3,501,923 | 3/1970 | Lehmer | 176/37 |
| 3,742,720 | 2/1973 | Ferguson et al. | 55/66 |
| 3,828,960 | 8/1974 | Walles | 215/13 R |
| 3,871,842 | 3/1975 | Queiser et al. | 176/37 |

*Primary Examiner*—Barry S. Richman
*Assistant Examiner*—Michael S. Marcus
*Attorney, Agent, or Firm*—Pollock, Vande Sande & Priddy

[57] ABSTRACT

In an apparatus for treating an exhaust gas from a nuclear plant which comprises a container and a cryogenic distillation apparatus disposed in the container for liquefying and separating a radioactive gas therefrom, an adsorbent such as an active carbon is filled in the container to surround the cryogenic distillation apparatus whereby leakage of the radioactive gas on the occasion of an accident can be removed.

3 Claims, 4 Drawing Figures

APPARATUS FOR TREATING AN EXHAUST GAS FROM NUCLEAR PLANT

This is a continuation of application Ser. No. 419,006, filed Nov. 26, 1973, now abandoned.

BACKGROUND OF THE INVENTION

The present invention relates to an apparatus for treating an exhaust gas from a nuclear plant, and more particularly to an apparatus for recovering radioactive gases especially Kr-85 from an exhaust gas of a nuclear plant.

With an increase in necessity of treating an exhaust gas discharged from nuclear plants such as nuclear power plants, used nuclear reprocessing plants, etc., in order to recover dangerous radioactive gases such as Kr-85, there have been tried developments of apparatus for treating the exhaust gas.

In a used nuclear fuel, various radioactive elements as fission products due to nuclear fission are included. It is undesirable to abandon them because it raises the operating cost of a nuclear plant. Accordingly, it is usual to reprocess the used nuclear fuel and thereby to obtain useful nuclear elements.

In reprocessing a used nuclear fuel, a fuel material is dissolved in an acid such as nitric acid and the resulting acid solution of fuel material is chemically purified to eliminate compounds composed of unnecessary elements therefrom.

In such a process, an exhaust gas which includes radioactive gases is generated. Particularly, since the gas of Kr-85 is a radioactive gas having a half life as long as about 10 years, the exhaust gas cannot be discharged directly into the atmosphere. For this reason, it is necessary to recover at least Kr-85 gas in radioactive gases generated in reprocessing. The present inventors have found that Kr-85 gas is separated efficiently from the exhaust gas by a cryogenic distillation method. To that effect, a cryogenic distillation device comprising a liquefying device, a continuous distillation tower and a batch distillation tower are enclosed in a casing (cold box) which is packed with an adsorbent.

Recovery of radioactive substances (hereinafter represented as Kr-85 gas) from an exhaust gas is effected as follows. Firstly, Kr-85 gas is separated from the exhaust gas by the continuous distillation tower, and concentration of Kr-85 is highly increased by the batch distillation tower. The concentrated Kr-85 gas is compressed and stored in a reservoir such as a pressure vessel. The cryogenic distillation apparatus serving for an air liquefying separation is provided with a safety valve, etc., but sometimes an explosion occurs on account of hydrocarbon and nitrogen oxides, etc., which are contained in the exhaust gas. In such an event, the casing of the apparatus must not be destroyed, but liquefied Kr-85 in the distillation tower evaporates and the inside of the casing is filled with the evaporated Kr-85 gas. Also a gas-leak accident may occur due to destruction of welded portions in the casing. Since the liquefying and distillation apparatus is provided with tubes for supplying liquid nitrogen to the liquefying apparatus, distillation apparatus, etc., it is not easy to completely seal it hermetically. Therefore, the evaporated Kr-85 gas leaks to the outside of the casing.

In an earlier effort to eliminate the above problem, in which the casing was filled with perlite which is widely used as a heat insulating material, it was found the insulating material could not adsorb the leaked Kr-85 gas. This is because perlite has a small specific surface area of less than 10 m$^2$/g and it cannot adsorb Kr-85 effectively.

As described above, where the cryogenic apparatus for liquefying and distillation of the exhaust gas is heat insulated by perlite, the leaked Kr-85 on the occasion of an accident is not prevented from leaking into the atmosphere and this heat insulating material is therefore not useful as a safeguard, insofar as the Kr-85 recovering apparatus is concerned.

SUMMARY OF THE INVENTION

An object of the present invention is to provide an apparatus for treating an exhaust gas from a nuclear plant suitable for recovering Kr-85 gas from the exhaust gas.

Another object of the invention is to provide an apparatus for treating an exhaust gas from a nuclear plant which is capable of preventing leakage of Kr-85 gas into the atmosphere on the occasion of accident.

The present invention provides an apparatus for treating an exhaust gas from a nuclear plant which comprises a cryogenic distillation apparatus disposed in a casing (cold box) filled with a heat insulating material having a good adsorption ability.

In the invention, an active carbon, silica gel, synthesized zeolite known by the name "Molecular Sieves", and activated alumina are used as the adsorbent. The specific surface areas of active carbon, silica gel, synthesized zeolite and activated alumina are 800–1000 m$^2$/g, 300–500 m$^2$/g, 500–600 m$^2$/g, and 200–400 m$^2$/g, respectively. Among the above adsorbents, active carbon is the most suitable for the invention because of its good adsorption ability and low cost. Therefore, in the following description, the present invention will be explained by reference to apparatus employing active carbon. The active carbon produced as a gas adsorbing one is particularly suitable for carrying out the present invention. Such active carbon can be filled in the cold box with a packing density of the order of 0.4–0.7 g/cm$^3$ on the average.

In cases where the density of the carbon pile in the cold box is less than 0.4 g/cm$^3$, the active carbon naturally settles in the cold box after the filling, so that a gas flows only partially through the carbon pile, or the condition of the filled active carbon is biased by gas-blowing for the desorption of the active carbon.

On the other hand, where the packing density of the carbon pile is larger than 0.7 g/cm$^3$, it takes a long time for desorption by heating, and it is difficult to cause a gas for preheating to pass therethrough in employment of a method of gas ventilating for preheating.

In the present invention, the cryogenic distillation apparatus, its attachments and pipings, etc., are surrounded by active carbon filled into the casing or cold box to adsorb any radioactive gas leaked from connected portions, pipings or other parts on the occasion of an accident, and thereafter the active carbon is subjected to desorption within the cold box or at the outside thereof. The construction of the cold box can be modified in accordance with the kind of the adsorption method to be employed.

Where the cold box is used continuously and the desorption treatments are carried out repeatedly, the cold box may be provided with a heater or a heating tube for flowing heated air therethrough, an exhausting tube for a desorbed gas extending from the outside wall thereof into the cold box and connecting to a pump, and an inlet port is formed at other portions of the outside wall to replace the desorbed gas by a fresh gas.

Also, where the period during the operation between the desorbing treatments is long, a forcing cooling pipe is provided in the cold box to prevent leakage of the adsorbed gas. In this case, a liquid from the cryogenic distillation apparatus may be caused to flow through the cooling pipe. Since the temperature in the cold box can be made uniform and reduced particularly towards the outside by providing the cooling pipe in the high temperature portion within the cold box, it is possible not only to increase the adsorbed amount of Kr-85 gas but also to completely prevent leakage of Kr-85 gas to the outside.

In the case where it is desired that the amount of the active carbon in the cryogenic distillation apparatus be reduced to make small the capacity of the desorption apparatus, the cold box may be a double-structure having two chambers, one being filled with an active carbon and the other with another heat insulating material such as perlite. Especially in the case where the active carbon is filled in the inside chamber, the amount of the active carbon can be made smaller. By providing the heat insulating material to the outside portion of the cold box, the heat insulating effect is relatively good.

On the other hand, where the active carbon is filled into the outside chamber, it is possible to easily exchange the active carbon and to prevent invasion of humidity and condensed substances from the outside of the cold box.

Furthermore, there can be provided in the container a safety valve, a rupture disc and other devices for causing leaked radioactive gas to draw out from the cold box thereby to prevent breakage of the apparatus.

In order to recover the adsorbed Kr-85 gas, the Kr-85 gas is caused to desorb from the active carbon by raising the temperature thereof and it is then adsorbed to another active carbon adsorbent in a cooled condition. The Kr-85 gas desorbed from the active carbon can be removed therefrom in a conventional desorbing method. In the desorption treatment, the active carbon may be heated by a heater or by supplying a preheated air or gas thereto.

It is desirable that the desorbing temperature be selected within the range of 105° to 120° C. If the desorbing temperature is lower than 105° C, the Kr-85 gas cannot be desorbed sufficiently. In order to avoid burning the active carbon, the desorbing temperature should be lower than 120° C.

The Kr-85 gas desorbed from the active carbon in the cold box and adsorbed on another active carbon is again desorbed for recovering the Kr-85. The Kr-85 gas thus desorbed is liquefied and distillated by recycling to the cryogenic distillation apparatus disposed in the cold box.

The safety factors of the cryogenic distillation apparatus employed for recovering the Kr-85 gas can be greatly improved.

In an example of the present invention, heating pipes are provided in the cold box filled with active carbon and only a heated gas may be supplied into the pipes to desorb the Kr-85 gas adsorbed on the active carbon so that the recovery operation can be easily carried out. In the case where the cold box is divided into two chambers which are operated cyclicly at the time of desorption, recovery of the Kr-85 gas can be carried out without stopping introduction of a gas to be treated thereinto.

Permeation of a condensed substance such as humidity in atmosphere into the cold box can be prevented and thereby the effect of the heat insulating material does not deteriorate.

DESCRIPTION OF THE PREFERRED EMBODIMENT

Hereinafter, the invention will be described more specifically by referring to the various embodiments shown in FIGS. 1 to 4.

Figure 1:
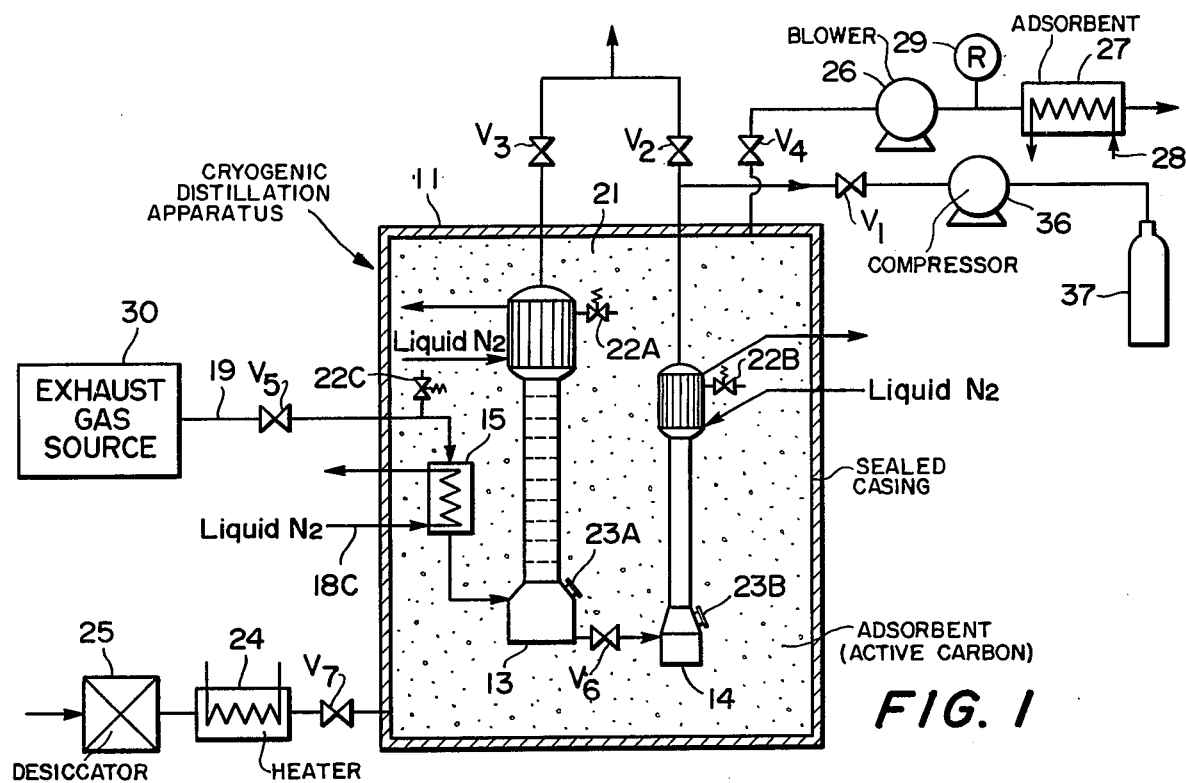
FIG. 1 is a schematic diagram showing an embodiment of the present invention.

In FIG. 1, numeral 11 identifies a casing (cold box) filled with an active carbon 21. Casing 11 contains a liquefying device 15 which is supplied with liquefied nitrogen gas via conduit 18C, and casing 11 also contains a continuous distillation tower 13 and a batch distillation tower 14 each of which is supplied with liquefied nitrogen gas via further conduits as illustrated. An exhaust gas from a source 30 is supplied through conduit 19 to the liquefying device 15 and thence to towers 13 and 14, the bottoms of which are connected to one another by a valved conduit.

Since the Kr-85 gas cannot be highly concentrated by only the continuous distillation tower 13, the exhaust gas is fed from tower 13 to the batch distillation tower 14 to highly increase the concentration of Kr-85 up to about 80%. The thus concentrated Kr-85 gas is taken out from the top of the batch distillation tower 14 and is compressed by compressor 36 for storage in a pressure vessel 37. Numeral 24 represents a heater and numeral 25 is a desiccator through which a gas for desorbing the Kr-85 gas is supplied. Numeral 26 is a blower and numeral 27 is an active carbon adsorbent cooled by a coolant supplied by conduit 28. Numeral 29 is a detector for detecting radioactivity of a gas desorbed from the active carbon 21. Numerals 22A, 22B, 22C, 23A and 23B are safety valves and rupture discs, respectively, each being disposed in the cold box 11. Valves $V_1$ through $V_7$ control the flow of gases in the system as discussed hereinafter in reference to FIG. 3.

The Kr-85 gas discharged from the distillation towers and the like due to actuating of the safety valves 22A, 22B, 22C or the rupture discs 23A, 23B on the occasion of an accident such as an explosion, is adsorbed on the active carbon 21 so that the gas does not leak to the outside of the cold box.

Desorption and removal of the Kr-85 gas adsorbed on the active carbon 21 is accomplished by operating the blower 26 to supply air which passes through the desiccator 25 and the heater 24 into the casing or cold box 11.

Further, the Kr-85 gas removed from the active carbon 21 is adsorbed and recovered by the active carbon adsorber 27. Such operation is continued until the Kr-85 gas is not detected by the detector 29.

The more the amount of the air and the higher the temperature increases thereof, the shorter the operating time becomes. For example, in order to remove the Kr-85 gas from 10 tons of active carbon, it takes about 50 hours in the case of supplying air of 50° C at the rate of 10 m³ an hour thereto and about 10 hours in the case of supplying air of 100° C at the rate of 20 m³ an hour thereto.

In order to effect the recovering operation within a short time in the event of an emergency, the cold box may be so constructed that a large amount of a high temperature air can be supplied thereto. The Kr-85 gas adsorbed and recovered by the active carbon adsorber 27 is heated and removed by the cryogenic distillation apparatus after repair of it is completed.

Figure 2:
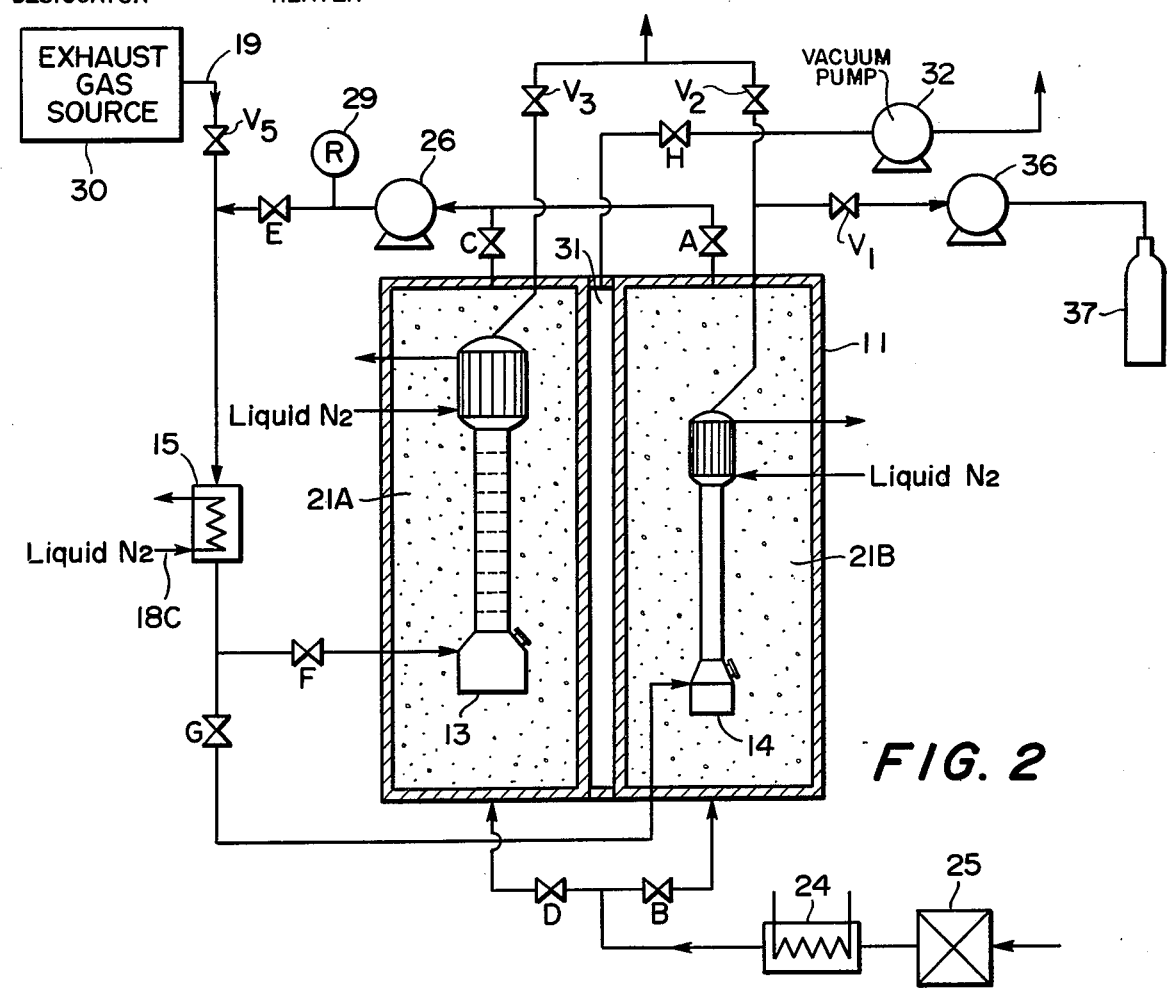
FIG. 2 is a schematic diagram of another embodiment of the present invention.

In FIG. 2, the same reference numerals used in FIG. 1 designate the same parts. Numeral 31 represents a vacuum tank for dividing the cold box 11 into two sections and numeral 32 is vacuum pump for evacuating tank 31. When an accident such as explosion or destruction of instruments happens, a desiccated and heated air is supplied to the active carbon 21A or 21B at the side in which the accident happens within the cold box to desorb the Kr-85 gas. When the leakage accident of the Kr-85 gas happens at the side of the batch distillation tower 14, in order to prevent leakage of the Kr-85 gas to atmosphere, after a valve H is opened and the vacuum tank is evacuated, valves A and B are opened to supply the air desiccated and heated by the desiccator 25 and the heater 24 respectively to the container. The removed Kr-85 gas is sent through the valve A, the blower 26 and a valve E to the liquefying device 15 together with a processing gas supplied through conduit 19, whereby the gases are liquefied and introduced to the continuous distillation tower 13 through a valve F. While the temperature of the active carbon 21B at the side of the batch distillation tower 14 is raised by supplying heated air thereto, the temperature in the continuous distillation tower 13 does not increase and it is possible to distillate the desorbed gas containing Kr-85 gas. Meanwhile the batch distillation tower 14 wherein the accident happened is repaired. Similarly, when a leakage accident of the Kr-85 gas happens at the side of the continuous distillation tower 13, valves C, D, E and G are opened to supply the removed Kr-85 gas to the batch distillation tower 14 for recovering Kr-85. According to this embodiment, the removed Kr-85 gas can be recovered without stopping introduction of the exhaust gas through conduit 19.

Figure 3:
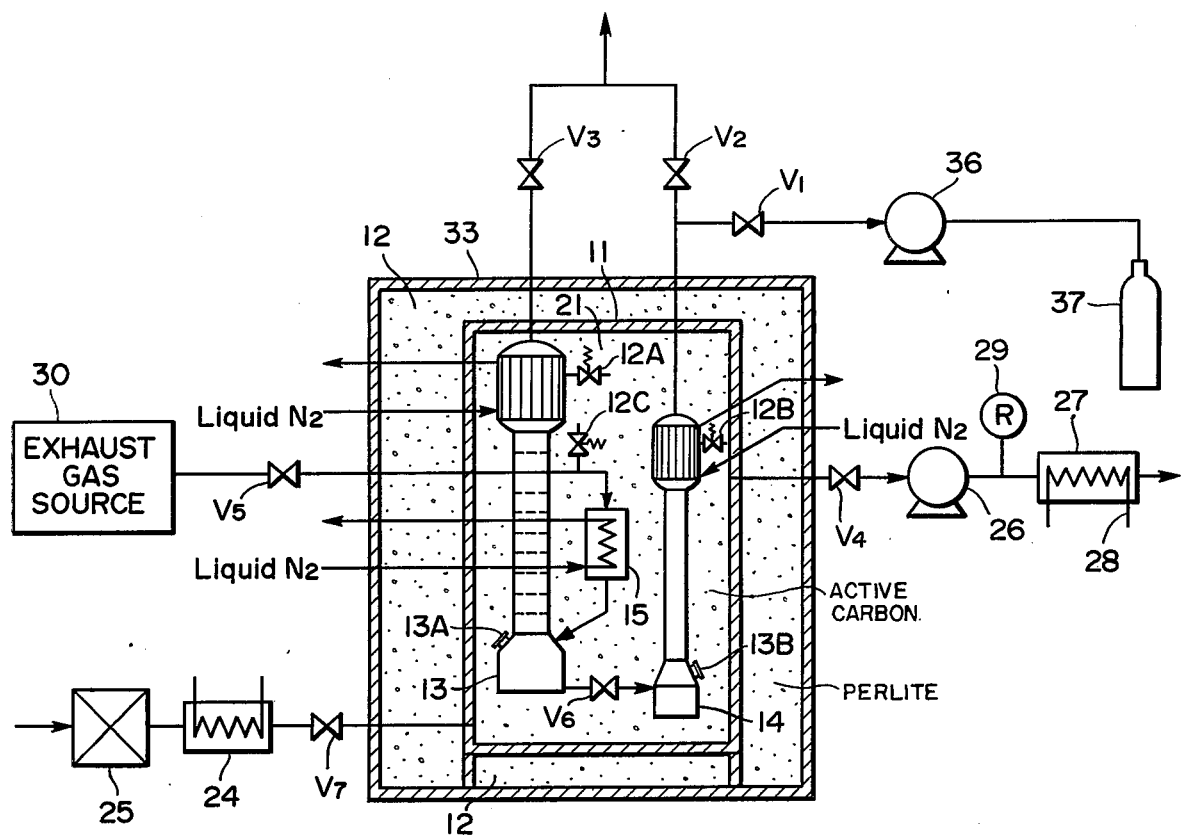
FIG. 3 is a schematic diagram of a further embodiment of the present invention.

In FIG. 3, the cold box 11 is enclosed by an exterior casing 33. The exterior space 12 between the two casings is filled with a heat insulating material having an excellent heat insulating effect, such as perlite. A heat insulating material having gas adsorption properties, whose specific surface area is larger than 100 m²/g, is filled into the casing 11. The cryogenic distillation apparatus is disposed within the casing 11 and is similar to the aforesaid embodiment. As explained in the above embodiments, liquefying device 15, continuous distillation tower 13, and batch distillation tower 14 are operated in the same manners as in the previous embodiments. The tops of the towers 13 and 14 and liquefying device 15 are cooled by a coolant such as liquefied nitrogen gas. An exhaust gas supplied from the source 30 is supplied through valve $V_5$ to the liquefying device 15. The liquefied exhaust gas is then supplied to the bottom of the continuous distillation tower 13 so as to concentrate the Kr-85 gas. The exhaust gas from which Kr-85 is removed is discharged through valve $V_3$ into the atmosphere. The concentrated exhaust gas is supplied through valve $V_6$ to the bottom of the batch distillation tower 14 so as to highly concentrate the Kr-85. The exhaust gas from which Kr-85 is removed is discharged through valve $V_2$, while the concentrated Kr-85 gas is supplied through valve $V_1$ and compressor 36 to a storing tank 37 such as a pressure vessel. Kr-85 leaked from such as safety valves 12A, 12B, 12C and rupture discs 13A, 13B on the occasion of accident, is adsorbed on the active carbon 21 filled in the casing 11. When Kr-85 adsorbed on the active carbon is desorbed, by heating the active carbon using heated air supplied through desiccator 25, heater 24 and valve $V_7$, valve $V_4$ is opened to allow the Kr-85 desorbed from the active carbon to be supplied through blower 26 to adsorber 27 filled with an adsorbent such as active carbon. The radioactivity of the desorbed gas is monitored by detector 29. After the regeneration of the active carbon in the casing 11 is completed, the valves $V_4$, $V_7$ are closed and Kr-85 adsorbed on the active carbon in the adsorber 27 is desorbed by heating. The desorbed gas containing Kr-85 is recycled to the passageway communicating with the continuous distillation tower 13. According to this construction the amount of the active carbon filled in the casing 11 is made sufficiently small, but still with a sufficient heat insulating effect, to shorten the desorption time.

Now, in the case where the average temperature of the active carbon 21 in the casing 11 is assumed to be −50° C for safety, the gas containing the Kr-85 gas of 300 μm³ can be adsorbed and processed by 1 ton of active carbon. Therefore, supposing that the amount of the gas included in the cryogenic distillation apparatus is 100 μm³ and the emitted Kr-85 gas is adsorbed on the active carbon uniformly, the amount of active carbon required is only 0.33.

If a safety factor 10 times larger than that in the above case is adopted, the amount of the active carbon is only 3.3 tons.

In this embodiment, the amount of the active carbon 21 is reduced to shorten the processing time for desorption without undesirably reducing the heat insulation effect as a whole, since the good heat insulating material surrounds the inner case.

The inner casing 11 is designed to have minimum size enough to attain the desired heat insulation effect determined by the size of the distillation tower. According to this embodiment, recovering of the Kr-85 gas can be attained similarly to the aforesaid embodiment and since the amount of the active carbon is small, the recovery operation time can be shortened. In case it is required to further reduce the filled amount of the active carbon, the inner casing 11 may be filled with a mixture of active carbon and another heat insulating material such as perlite. The temperature of the active carbon in the inner casing 11 rises slightly and the required amount thereof increases by filling the active carbon into the exterior casing 33 and another heat insulating material into the inner casing 11 but it becomes possible to exchange the active carbon more easily and to prevent permeation of a condensed substance such as humidity in atmosphere to the cold box particularly the inner casing 11 and reduction of the heat insulation effect of the cold box.

In the cold box the temperature of the active carbon at the outside is higher than that at the inside and the adsorbing function of the active carbon decreases in response to the temperature rise thereof.

Figure 4:
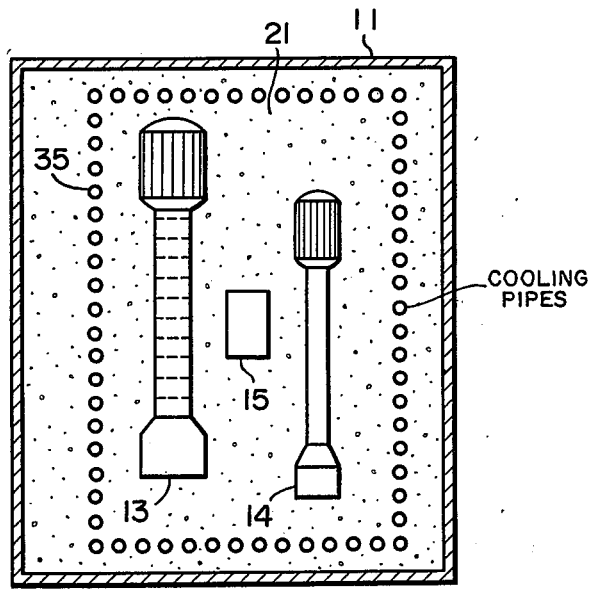
FIG. 4 is a schematic diagram partially illustrating a still further embodiment of the present invention.

It may be considered that since the active carbon of lower temperature is blown away due to the radial outflow of the gas on the occasion of an explosion accident, the Kr-85 gas then passes through the active carbon of a higher temperature and leaks to the outside of the cold box. In the embodiment shown in FIG. 4, a cooling pipe 35 is disposed to surround the apparatus 13 to 15 within the cold box 11 and it is possible by cooling the active carbon 21 with the pipe to improve the heat insulation effect as well as to prevent leakage of the Kr-85 gas on the occasion of the accident. In FIG. 4, only the main parts of the apparatus are shown. It goes without saying that necessary pipings, valves, etc., are combined with these main parts.

What we claim is:

1. In an apparatus for treating exhaust gases which include a radioactive gas, said apparatus comprising cryogenic liquefaction and distillation means for liquefying and distilling the radioactive gas from the exhaust gases, radioactive gas recovering means, conduit means for conveying exhaust gases to be treated to the inlet means of said cryogenic liquefying and distilling means from a source of gases to be treated and for conveying treated gases from an outlet means thereof to the recovery means, the improvement wherein said cryogenic liquefaction and distillation means comprises a plurality of distillation units which are disposed within a casing that is divided into a plurality of chambers which respectively enclose each unit of the cryogenic distillation means and which provide an airtight seal around the cryogenic distillation means, a vacuum compartment disposed between each of said chambers so as to increase the thermal insulation effect between the chambers, and a heat insulating material having adsorbent properties packed into said chambers and surrounding the distillation units, said adsorbent material being a particulate material selected from the group of active carbon, silica gel, synthesized zeolite and activated alumina, said particulate adsorbent having a specific surface area greater than 100 m$^2$/g and being capable of adsorbing the radioactive gas in the event that there is any leakage of the radioactive gas from the cryogenic distillation means during the recovery operation thereby to prevent accidental escape of the radioactive gas upon occurrence of the leakage.

2. In an apparatus for treating exhaust gases which include a radioactive gas, the apparatus comprising cryogenic liquefaction and distillation means for liquefying and distilling the radioactive gas from the exhaust gases, radioactive gas recovering means, conduit means for conveying exhaust gas to be treated to the inlet means of said cryogenic liquefaction and distillation means from a source of gases and for conveying treated gas from an outlet means thereof to the recovery means, the improvement comprising a first casing surrounding the cryogenic liquefaction and distillation means to provide an airtight seal around said cryogenic liquefaction and distillation means, an adsorbent heat insulating material being filled and packed into said first casing, said adsorbent being a particulate material selected from the group of active carbon, silica gel, synthesized zeolite and activated alumina, said particulate adsorbent having a specific surface area greater than 100 m$^2$/g and being capable of adsorbing the radioactive gas in the event that there is any leakage of the radioactive gas from the cryogenic liquefaction and distillation means during the recovery operation thereby to prevent accidental escape of the radioactive gas upon occurrence of the leakage, a second casing surrounding said first casing in spaced relation thereto, and perlite filled into said space between said first and second casings, the perlite having better heat insulating properties than the material in said first casing.

3. The apparatus of claim 2 wherein said adsorbent heat insulating material is filled into said first casing around said cryogenic liquefaction and distillation means with an average packing density in the range of 0.4 to 0.7 g/cm$^3$.

* * * * *